United States Patent [19]

Ichimura et al.

[11] Patent Number: 5,277,269
[45] Date of Patent: Jan. 11, 1994

[54] ENGINE REVOLUTION SPEED CONTROL DEVICE FOR A HYDRAULICALLY DRIVEN VEHICLE

[75] Inventors: Kazuhiro Ichimura; Seiji Tamura, both of Ibaraki; Akira Tatsumi, Kashiwa; Mitsuo Kihara; Junichi Hosono, both of Ibaraki; Kazuo Asano, Tsuchiura, all of Japan

[73] Assignee: Hitachi Construction Machinery Co., Ltd., Tokyo, Japan

[21] Appl. No.: 930,513

[22] PCT Filed: Feb. 5, 1992

[86] PCT No.: PCT/JP92/00115

§ 371 Date: Nov. 17, 1992

§ 102(e) Date: Nov. 17, 1992

[30] Foreign Application Priority Data

Feb. 8, 1991 [JP] Japan .................................. 3-60923
Feb. 5, 1992 [JP] Japan .................................. 3-35451

[51] Int. Cl.⁵ .................................................. B60K 17/00
[52] U.S. Cl. ....................................... 180/306; 60/391; 60/388
[58] Field of Search ............... 180/301, 305, 306, 307, 180/170, 69.3; 74/856, 865, 867, 870, 871; 60/388, 389, 390, 391, 449, 327; 123/349, 364, 365, 376, 377

[56] References Cited

U.S. PATENT DOCUMENTS

| | | | |
|---|---|---|---|
| 4,542,802 | 9/1985 | Garvey et al. ............... | 180/306 |
| 4,704,866 | 11/1987 | Myers ........................ | 180/306 |
| 4,759,185 | 7/1988 | McConnell et al. ........... | 180/306 |

FOREIGN PATENT DOCUMENTS 2-185876 7/1990 Japan .
3-135844 6/1991 Japan .

Primary Examiner—Richard M. Camby
Attorney, Agent, or Firm—Oliff & Berridge

[57] ABSTRACT

An engine revolution speed control device according to the present invention comprises: a hydraulic pump (1) which is driven by an engine (21); a hydraulic motor (4) for vehicle movement which is driven by oil expelled from the hydraulic pump (1) during vehicle movement; an actuator (52) for working which is driven by the oil expelled from the hydraulic pump (1) during the working state; a vehicle driving pedal (6) which during vehicle movement controls vehicle speed according to its amount of operation; a means (33) for speed reduction decision which makes a decision as to whether the amount by which the vehicle driving pedal (6) is depressed is being reduced; and a means for revolution speed control (33). The means for revolution speed control (33) performs normal control by increasing or decreasing the revolution speed of the engine according to the amount by which the vehicle driving pedal (6) is depressed, and, when it is decided that the amount by which the vehicle driving pedal (6) is depressed is decreasing, performs controlled slowing down by reducing the revolution speed of the engine while delaying its reduction amount. And, when during working the engine revolution speed is being adjusted by the use of the vehicle driving pedal (6), controlled slowing down is prevented even when the amount by which the vehicle driving pedal (6) is depressed is decreasing.

15 Claims, 8 Drawing Sheets

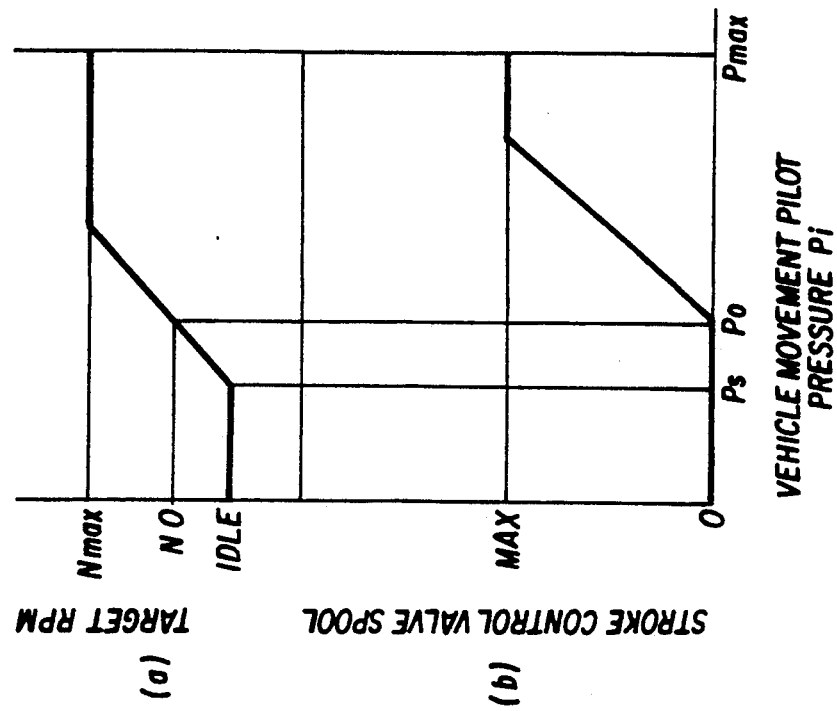
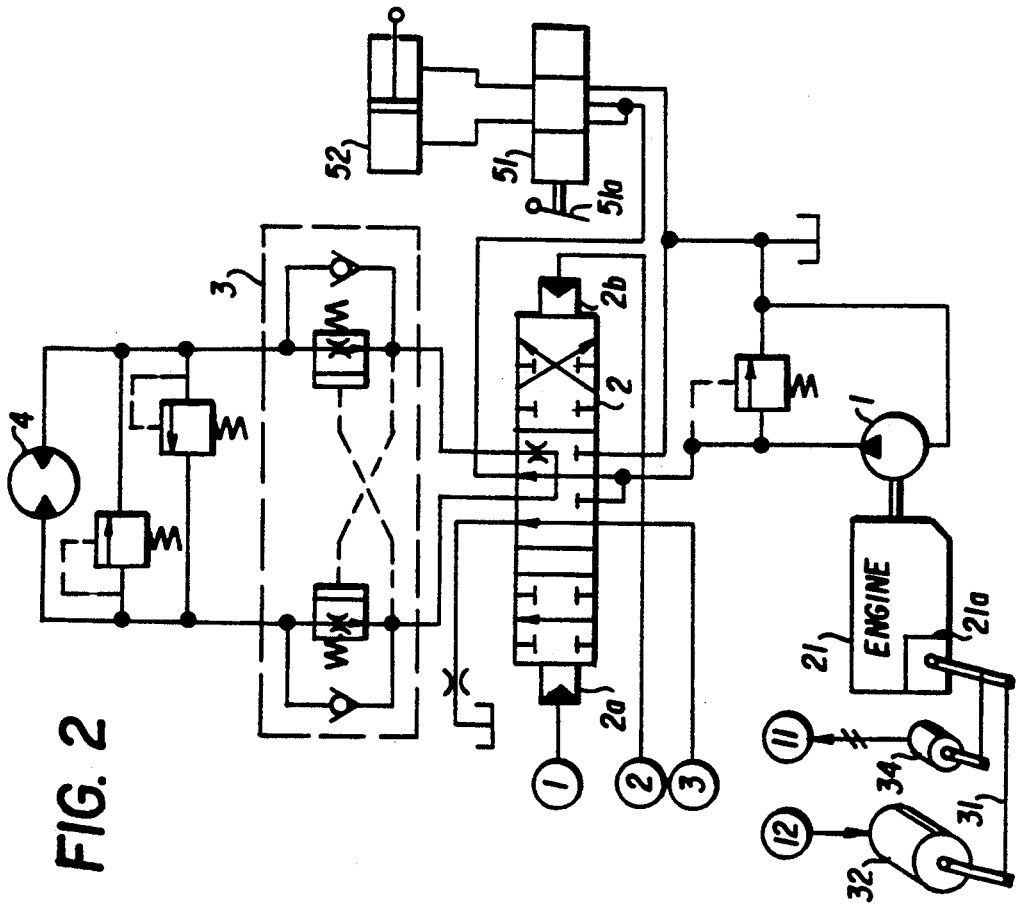

ENGINE REVOLUTION SPEED CONTROL DEVICE FOR A HYDRAULICALLY DRIVEN VEHICLE

TECHNICAL FIELD

The present invention relates to an engine revolution speed control device which is used for a hydraulically driven vehicle such as a wheel type hydraulic shovel or the like.

BACKGROUND ART

Before the present applicant, for example in Japanese Patent Laying-Open Publication Serial No.3-135844, has proposed the following type of hydraulically driven vehicle has been proposed. With this hydraulically driven vehicle, when the vehicle movement is accelerated, along with increasing the revolution speed of the engine according to the amount by which the vehicle driving pedal (accelerator pedal) is stepped upon, the flow supply of hydraulic fluid to the hydraulic motor for vehicle movement is also increased. Further, when the driving pedal is released so as to initiate deceleration action, from the point of view of preventing cavitation, along with performing controlled slowing down by which the engine revolution speed is gradually dropped according to the passage of time without directly reducing the engine revolution speed to the idling revolution speed even when the driving pedal is released, also slow return control is performed by which the control valve for vehicle movement is gradually returned to its neutral position.

However, if the above described controlled slowing down is always permitted, various problems arise during specific operations.

(1) The present applicant, in the specification of Japanese Patent Application Serial No. 2-185876, has proposed a hydraulically driven vehicle in which the engine revolution speed can be increased and decreased according to the amount by which a vehicle driving pedal is stepped upon, not only during vehicle movement but also while performing work such as excavation or the like. However if during reduction of vehicle moving speed as described above controlled slowing down is performed, then the controlled slowing down will also undesirably always be in operation during working when the engine revolution speed is adjusted by the use of the vehicle driving pedal, and this will give rise to the problem of bad operational feeling.

(2) Sometimes it can happen that the operator, with his foot poised over the vehicle driving pedal although he has no plans to move the vehicle away from rest, may even for only an instant slightly depress the vehicle driving pedal, so that the engine revolution speed is slightly increased, and the control valve for vehicle movement also slightly opens. At this time, if the above described controlled slowing down control and also slow return control are performed, pressurized hydraulic fluid may be supplied from the control valve to the hydraulic motor.

DISCLOSURE OF INVENTION

The objective of the present invention is to provide an engine revolution speed control device for a hydraulically driven vehicle so constructed that, in specific operational circumstances, when speed reduction action is performed by use of the vehicle driving pedal, controlled slowing down of the engine revolution speed is prohibited.

(1) The present invention is applied to an engine revolution speed control device for a hydraulically driven vehicle, comprising: a hydraulic pump which is driven by an engine; a hydraulic motor for vehicle movement which is driven by oil expelled from said hydraulic pump during vehicle movement; an actuator for working which is driven by the oil expelled from said hydraulic pump during the working state; a vehicle driving pedal which during vehicle movement controls vehicle speed according to its amount of operation; a means for speed reduction decision which makes a decision as to whether the amount by which said vehicle driving pedal is depressed is being reduced; and a means for revolution speed control, which performs: a first type of engine revolution speed control by increasing or decreasing the revolution speed of said engine according to the amount by which said vehicle driving pedal is depressed; and a second type of engine revolution speed control by reducing the revolution speed of said engine while delaying its reduction amount, when it is decided that the amount by which said vehicle driving pedal is depressed is decreasing.

And the above described objective is achieved by providing a means for prevention, which in specific operational conditions prevents said second type of engine revolution speed control even when the amount by which said vehicle driving pedal is depressed is decreasing.

In the specific operational conditions, bad effects of the second type of engine revolution speed control can be prevented.

(2) It is desirable to construct the above described means for detecting the working state, which makes a decision as to whether said hydraulic actuator for working is in the state of being able to be actuated, as included in said prevention means, and to prevent control of engine revolution speed according to said second type of engine revolution speed control, when a decision is made by said working state detection means that said hydraulic actuator for working is in the state of being able to be actuated.

By not performing said second type of engine revolution speed control when the engine revolution speed is being adjusted by the vehicle driving pedal during working, the operational feeling is prevented from being deteriorated.

(3) Further, the engine revolution speed control device may include a means for deciding upon the vehicle movement state which makes a decision as to whether said hydraulic motor for vehicle movement is being operated. In this case, when a decision is made by said vehicle movement state decision means that said hydraulic motor for vehicle movement is being operated, engine revolution speed is controlled by said means for revolution speed control according to said second type of engine revolution speed control.

When the vehicle movement state is detected, during vehicle acceleration the engine revolution speed is increased according to the amount by which the vehicle driving pedal is stepped upon. That is, the first type of engine revolution speed control (normal engine revolution speed control) is performed. During vehicle deceleration when the vehicle driving pedal is released, according to the decrease of the amount b which the vehicle driving pedal is stepped upon, the engine revolution speed is not decreased, but according to the lapse of time the engine revolution speed is decreased. That is, the second type of engine revolution speed control (controlled slowing down) is performed. Accordingly during deceleration of vehicle movement the generation of cavitation is prevented.

(4) The engine revolution speed control device may include both the above described working state detection means and also the above described vehicle movement state decision means.

(5) The engine revolution speed control device according to the present invention can also be applied to a vehicle comprising a means for detecting forward and reverse movement which detects forward and reverse movement and the neutral state of said vehicle, a working brake device which during the working stat provides braking force to a running wheel of the vehicle, and a means for detecting braking which detects when said working brake device is in operation. In this case, said working state detection means makes a positive working state decision when said forward and reverse movement detection means detects the neutral state of the vehicle and also said braking detection means detects the operation of said working brake device.

(6) The engine revolution speed control device according to the present invention can also be applied to a vehicle comprising a means for detecting forward and reverse movement which detects forward and reverse movement and the neutral state of said vehicle, a working brake device which during the working state provides braking force to a running wheel of the vehicle, a means for detecting braking which detects when said working brake device is not in operation, and a hydraulic motor operation detection means which detects whether said hydraulic motor for vehicle movement is being operated. In this case, said vehicle movement detection means makes a positive vehicle movement decision when said forward and reverse movement detection means detects a state other than the neutral state of the vehicle, said braking detection means does not detect the operation of said working brake device, and also operation of said hydraulic motor for vehicle movement is detected.

(7) If the engine is a diesel engine, it is also desirable for said revolution speed control means to comprise a means for commanding, which commands a target engine revolution speed, a means for detection, which detects the position of a governor lever showing control revolution speed, and a means for driving, which drive controls the governor lever based upon the difference between the target engine revolution speed and the control revolution speed.

(8) If the above described diesel engine is used, it is also possible to achieve said second type of engine revolution speed control by delaying the timing of drive controlling said governor lever based upon the difference between the target engine revolution speed and the control revolution speed.

(9) It is desirable for the idling revolution speed to be set by said revolution speed control means in the following manner. During vehicle movement, when said vehicle driving pedal is not operated, said revolution speed control means sets the revolution speed of said engine to a first idling revolution speed, and during working, when said vehicle driving pedal is not operated, said revolution speed control means sets the revolution speed of said engine to a second idling revolution speed lower than said first idling revolution speed.

When the engine revolution speed is being controlled by the vehicle driving pedal, because the idling revolution speed during working is set lower than the idling revolution speed during vehicle movement which is set higher, thereby there is no deterioration of fuel consumption during working, and during vehicle movement the following advantages are obtained.

1. If hydraulic power steering is being used, even if the steering actuation angle when starting off the vehicle from rest is great the flow of hydraulic fluid does not become insufficient, and brisk and nimble steering action is possible.

2. If vehicle movement operation is performed by the use of a pilot pressure, the flow of hydraulic fluid from the pump for the pilot pressure is great when starting off the vehicle from rest, so that deterioration of the responsiveness due to the over ride characteristic of the pilot relief valveis is prevented.

3. Because the flow amount of the hydraulic pump is high during vehicle deceleration, it never happens that the force required for steering operation suddenly becomes heavy.

4. Cavitation during vehicle deceleration is prevented.

5. The phenomenon of engine dragging during vehicle acceleration does not occur, and the accelerability is improved.

(10) It is desirable to provide a control valve which conducts oil expelled from said hydraulic pump to said hydraulic motor for vehicle movement in a flow amount according to the amount by which said vehicle driving pedal is depressed, and which starts to move towards the open position in a region above an amount of depression which increases the revolution speed of said engine up to a predetermined value. Because pressurized hydraulic fluid is supplied to the hydraulic motor for vehicle movement after the engine revolution speed has increased to above the predetermined revolution speed, i.e. after the output power of the engine has become greater than a predetermined value, overtorque does not occur, and stalling of the engine and the generation of black smoke also do not occur.

(11) Further, it is also possible to construct said prevention means to include a depression time determination means which determines the time period for which said vehicle driving pedal has been depressed, and to prevent the controlling of engine revolution speed by said second type of engine revolution speed control when said vehicle driving pedal has not been depressed for at least a predetermined time period, as determined by said depression time determination means.

Even if the prevention means is constructed in this manner, it is possible to provide various aspects substantially identical to the above described ones. With this prevention means, if the vehicle driving pedal is only instantaneously depressed the second type of engine revolution speed control is not performed, so that when the vehicle driving pedal is released the engine revolution speed is diminished immediately. Accordingly, even if slow return control is being performed for the flow control valve for vehicle movement, no excessive hydraulic fluid pressure is supplied to the hydraulic motor, and starting off from rest is prevented when not desired by the vehicle operator.

According to the present invention as described above, when so called controlled slowing down is being performed during vehicle movement when the vehicle is decelerated from the point of view of prevention of cavitation, if the vehicle driving pedal is so to speak blipped, i.e. is depressed and then immediately is released, then the controlled slowing down is prevented, so that the engine revolution speed immediately is reduced. Thereby, when the vehicle is decelerated during vehicle movement, along with cavitation being reliably prevented, when the vehicle driving pedal is blipped there is no danger of pressurized hydraulic fluid being supplied to the vehicle driving motor.

DESCRIPTION OF DRAWINGS

FIG. 2 is an enlargement of a portion of FIG. 1;

FIG. 10 is a graph for a control valve for vehicle movement used in each of the above embodiments, showing a first example of the stroke of the valve spool and engine revolution speed against vehicle driving pilot pressure; and:

Best Mode for Carrying Out the Invention

Embodiment 1

A first embodiment of the present invention, which is applied to a revolution speed control device for a wheel type hydraulic shovel, will now be described with reference to FIGS. 1 through 7. This first embodiment is arranged to improve the operational feeling when controlling engine revolution speed by the vehicle driving pedal during work such as excavation or the like by preventing controlled slowing down during such work, while performing controlled slowing down operation during vehicle movement.

Figure 1:
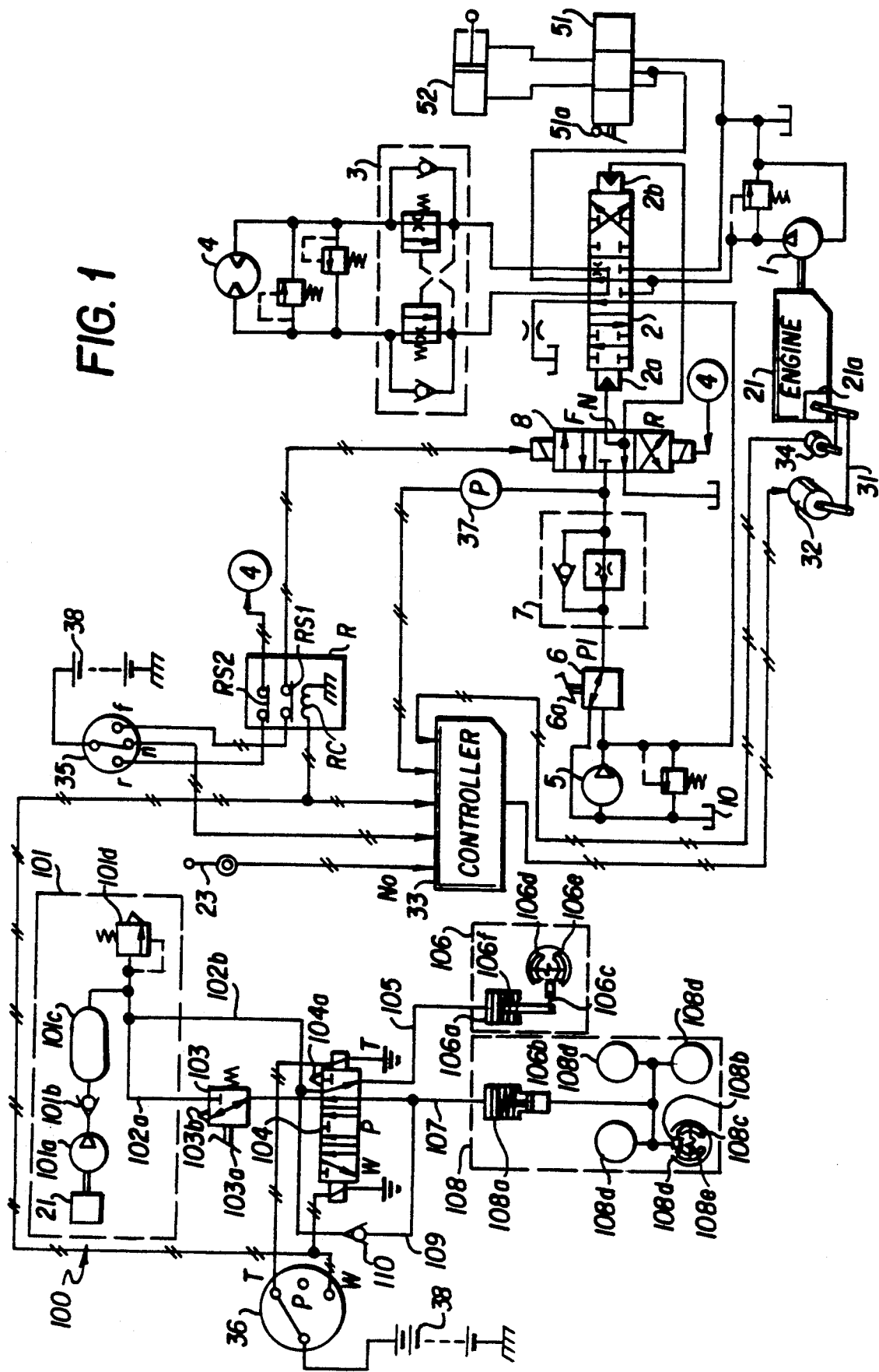
FIG. 1 is a figure showing the overall construction of a first embodiment of the present invention, including an engine revolution speed control device, a hydraulic pressure circuit, and a brake circuit.
Figure 3:
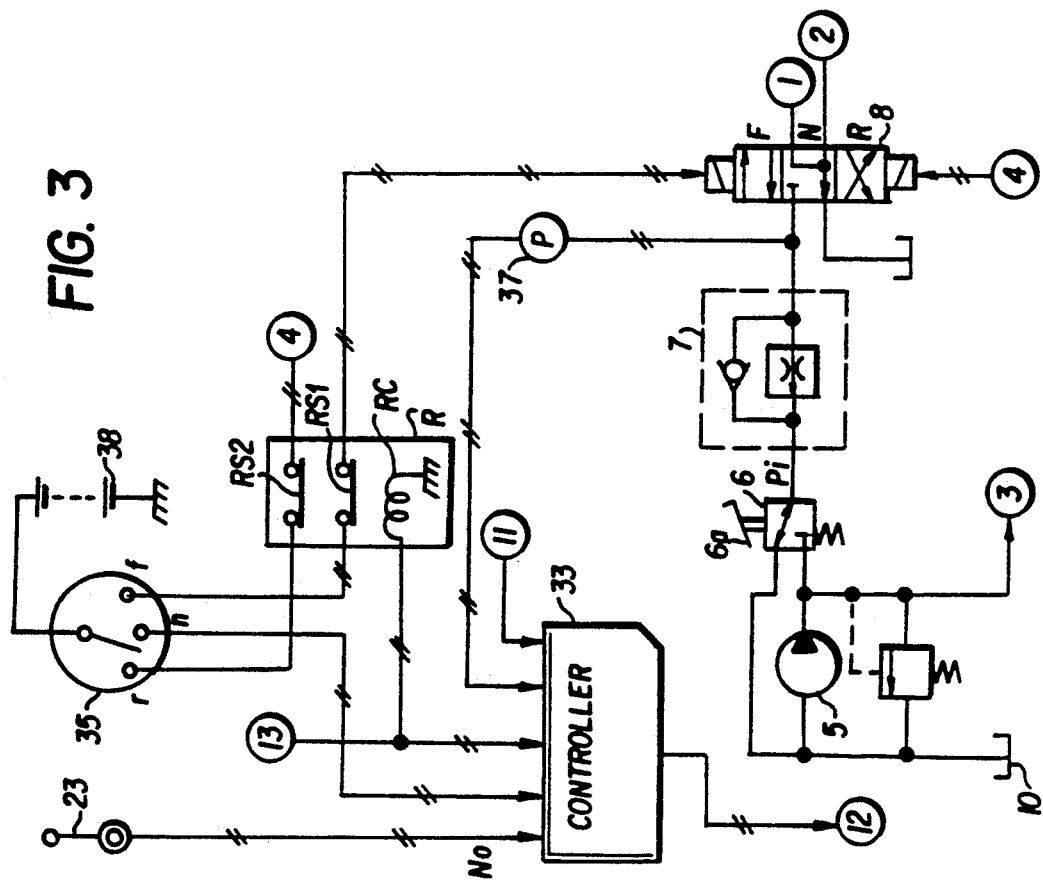
FIG. 3 is an enlargement of a portion of FIG. 1.
Figure 4:
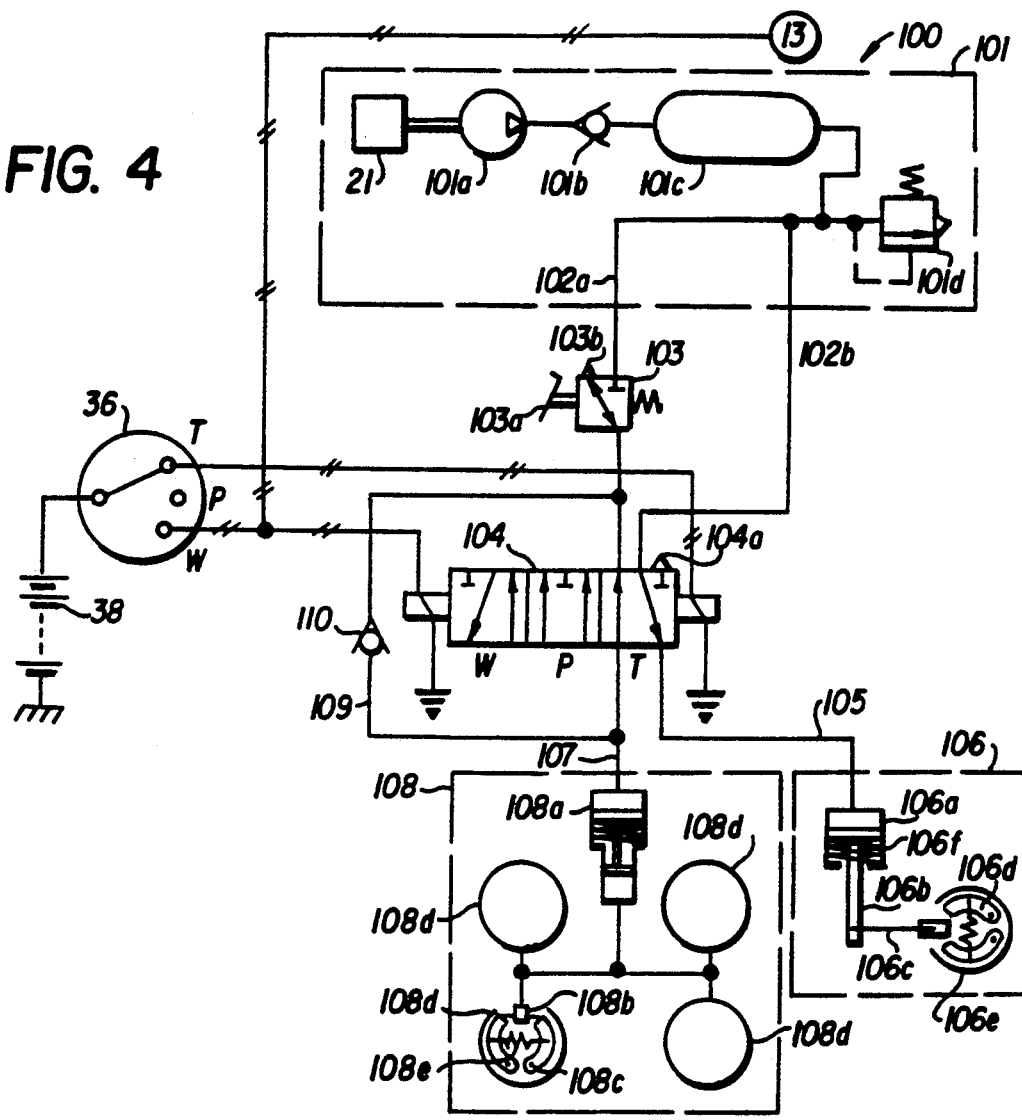
FIG. 4 is an enlargement of a portion of FIG. 1.
Figure 5:
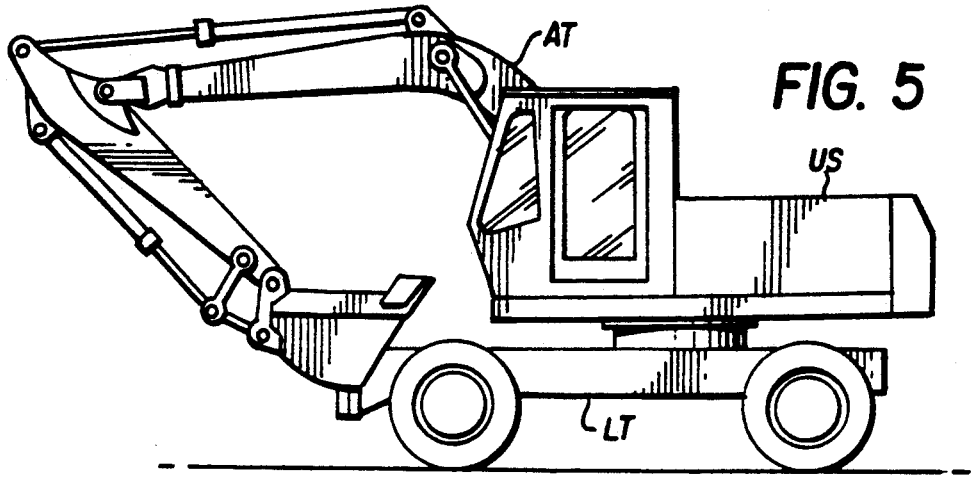
FIG. 5 is a side view of a wheel type hydraulic shovel.

The wheel type hydraulic shovel shown in FIG. 5 has an upper rotating body portion US and a lower moving body portion LT, and a work attachment AT is fitted to the upper rotating body portion US. FIG. 1 shows a vehicle driving hydraulic pressure circuit, an engine revolution speed control circuit, and a brake circuit for such a hydraulic shovel. And FIGS. 2 through 4 are enlargements of various portions of FIG. 1.

Referring to FIGS. 1 through 4, oil which is ejected from a hydraulic pressure pump 1 which is driven by an engine, preferably a diesel engine 21 provided with an all speed governor, is supplied via a hydraulic pressure pilot type control valve 2 and through a counterbalance valve 3 to a hydraulic motor 4 for vehicle movement. Switching over of this control valve 2 is controlled by a pilot hydraulic pressure circuit composed of a hydraulic pressure pump 5, a pilot valve 6, a slow return valve 7, and a forward/reverse changeover valve 8.

A governor 21a of the engine 21 is connected via a link 31 to a pulse motor 32, and the revolution speed of the engine 21 is thereby controlled according to the rotational position of the pulse motor 32. That is, the revolution speed of the engine 21 is increased by rotation of the pulse motor 32 in the forward direction, while it is reduced by rotation of the pulse motor 32 in the reverse direction. The rotation of the pulse motor 32 is controlled by a control signal from a controller 33. Further, a potentiometer 34 is connected to the lever of the governor 21a, and the position of the lever of the governor 21a, which corresponds to the revolution speed of the engine 21, is determined from this potentiometer 34. The thus determined value Nrp of governor position (hereinafter also called the controlled revolution speed) is input to the controller 33.

A fuel lever 23, the n terminal of a forward/reverse changeover switch 35, and the W terminal of a brake switch 36, provided in a driver compartment of the upper rotating body portion US, are also connected to the controller 33, as likewise is a pressure sensor 37 provided in the conduit between the pilot valve 6 and the forward/reverse changeover valve 8. This pressure sensor 37 detects the value Pi of pilot pressure which is generated proportional to the degree of operation (depression) of a vehicle driving pedal 6a (accelerator pedal), and inputs it to the controller 33. The fuel lever 23 is provided for controlling the revolution speed of the engine 2 by hand operation, and according to its degree of operation a revolution speed signal No is input to the controller 33.

The common terminal of the forward/reverse changeover switch 35 is connected to a battery 38, while its f and r terminals are connected to solenoid portions of the forward/reverse changeover valve 8 via normally closed contacts RS1 and RS2 respectively of a relay R. Thereby, according to said forward/reverse changeover switch 35 being switched to its n, f, or r position, the forward/reverse changeover valve 8 is switched over to its N, F, or R position respectively. When said forward/reverse changeover switch 35 is at its n position, a high level signal indicating the neutral state is input to the controller 33.

When the forward/reverse changeover valve 8 is shifted to its F position (the forward driving position) or to its R position (the reverse driving position) and the vehicle driving pedal 6a is operated, then oil ejected from the hydraulic pressure pump 5 is controlled by the pilot valve 6, and a pressure regulated according to the operation (depression) of said vehicle driving pedal 6a is supplied, via the slow return valve 7 and the forward/reverse changeover valve 8, to the pilot ports 2a and 2b of the control valve 2. Accordingly the control valve 2 is shifted by a determinate amount in a determinate direction, and at this time as described later the engine revolution speed is increased or decreased according to the amount of operation of the vehicle driving pedal 6a. Thus oil (hydraulic fluid) ejected from the hydraulic pressure pump 1, which is rotating according to the amount of operation of the vehicle driving pedal 6a, is supplied to the hydraulic motor 4 in an amount just according to the amount of shifting of the control valve 2. In this way the hydraulic motor 4 is driven, and thereby the vehicle proceeds, either forwards or backwards, at a speed corresponding to the amount of operation of the vehicle driving pedal 6a.

The brake switch 36 is selectively operated by the vehicle operator in accordance with one of vehicle movement, vehicle parking and performing work such as excavation, and its common terminal is connected to the battery 38, while its W terminal is connected to the controller 33. The W terminal of this brake switch 36 is also connected to the coil RC of the relay R, and thus the relay coil RC is energized by switching of the switch 36 to its W position. When the relay coil RC is energized, the above described normally closed contacts RS1 and RS2 are opened, and in this condition the forward/reverse changeover switch 35 and the forward/reverse changeover valve 8 are disconnected from one another, and even if the switch 35 is shifted to its f position or to its r position the forward/reverse changeover valve 8 is left in its N position which indicates the neutral state.

Further, oil ejected from the hydraulic pressure pump 1 described above is also supplied via a control valve 51 to a working cylinder 52 (for example a boom cylinder). Accordingly the working cylinder 52 can be lengthened or shortened by operating the control valve 51 according to the operation of a working lever 51a, and thereby work (such as excavation) can be performed by operating a working attachment. It would also be acceptable to switch over the control valve 51 by pilot hydraulic pressure. During this work, by doing as described later it is possible to control the revolution speed of the engine by the vehicle driving pedal, so that as compared with revolution speed control by operation of the fuel lever 23, fine control (delicate adjustment) is attained. This engine revolution control contributes to noise reduction and improvement in fuel consumption, because the engine revolution speed does not keep at high value which is desirable only when a specific operation is performed.

Further, with reference to FIGS. 1 and 4, the reference numeral 100 denotes a braking system, and this braking system 100 comprises a positive type main brake device 108 which applies a service brake by supplying compressed air from a compressed air supply 101, and a negative type parking brake device 106 which releases a brake by compressed air applied from the compressed air supply 101 while it applies said brake by exhausting said compressed air. And, in this embodiment, during working (excavation etc.), both the main brake device 108 and the parking brake device 106 are applied simultaneously.

The compressed air supply 101 includes a compressor 101a driven by the engine 21, whose delivery side is connected to an air tank 101c via a one way valve 101b. Further, a relief valve 101d is provided which keeps the internal pressure of the air tank 101c at a constant level. An input conduit 102a on the one side connected to the air tank 101c is connected to an input port of a vehicle driving brake valve 103, and an input conduit 102b on the other side is connected to a first input port of a brake switchover valve 104. Further, an output port of the vehicle driving brake valve 103 is connected to another input port of the brake switchover valve 104. The vehicle driving brake valve 103 outputs at its output port a pressure corresponding to the amount by which a pedal 103a is stepped upon, and when the pedal 103a is released the output port is communicated to an atmosphere port 103b. Further, the brake switchover valve 104, according to the switching operation of the brake switch 36 to its terminals T, P, or W, is switched over to a vehicle driving position (T), a parking position (P), or a working position (W). The brake switchover valve 104 is also provided with an exhaust port 104a.

A first exhaust port of the brake switchover valve 104 is connected via a conduit 105 to the negative type parking brake device 106, and another exhaust port is connected via a conduit 107 to the positive type main brake device 108. Further, the output port of the vehicle driving brake valve 103 is connected to the main brake device 108 via a conduit 109 in which is disposed a one way valve 110, and pressurized air from the vehicle driving brake valve 103 is allowed to flow directly to the main brake device 108.

The conduit 107 connected to the main brake device 108 is connected to an input port of an air pressure/hydraulic pressure conversion and augmentation device 108a, whose output port is connected to a plurality of brake cylinders 108b of the vehicle wheels. And the brake cylinders 108b press brake shoes 108c against brake drums 108d so as to apply the vehicle brakes. Further, return springs are denoted by 108e.

A conduit 105 connected to the parking brake device 106 is connected to the input port of another air pressure/hydraulic pressure conversion and augmentation device 106a, and its piston rod 106b is linked to brake shoes 106d via a brake lever 106c. The vehicle brakes are applied by these brake shoes 106d being pressed against brake drums 106e. Further, a return spring 106f is slidably disposed around the piston rod 106b, and its restoring force normally impels it in the direction to apply the parking brake. Accordingly this parking brake device 106 releases the brake upon supply of pressurized air, while upon exhausting of the pressurized air the brake comes to be operated.

With the above described braking system 100, when the brake switch 36 is switched to its vehicle driving position T, the brake switchover valve 104 is switched over to its position shown in the figure by T, and pressurized air is supplied from the compressed air supply 101 to the parking brake device 106, so that the parking brake comes to be released, and further during vehicle driving the so called service brake is applied by the main brake device 108 being operated according to the amount by which the brake pedal 103a is stepped on. When the brake switch 36 is switched to its working position W, the brake switchover valve 104 is switched over to its W position, and, along with pressurized air being supplied to the main brake device 108 without the operation of the brake pedal 103a so that the service brake is applied, also because pressurized air is exhausted from the parking brake device 106 the parking brake is applied. Accordingly, both of the brakes are simultaneously applied, and the so called braked condition for working is attained. When the brake switch 36 is switched to its parking position P, the brake switchover valve 104 is switched over to its P position, and pressurized air is exhausted from the parking brake device 106 so that the parking brake is applied. The main brake device 108 is operated according to the amount by which the brake pedal 103a is stepped on.

Figure 6:
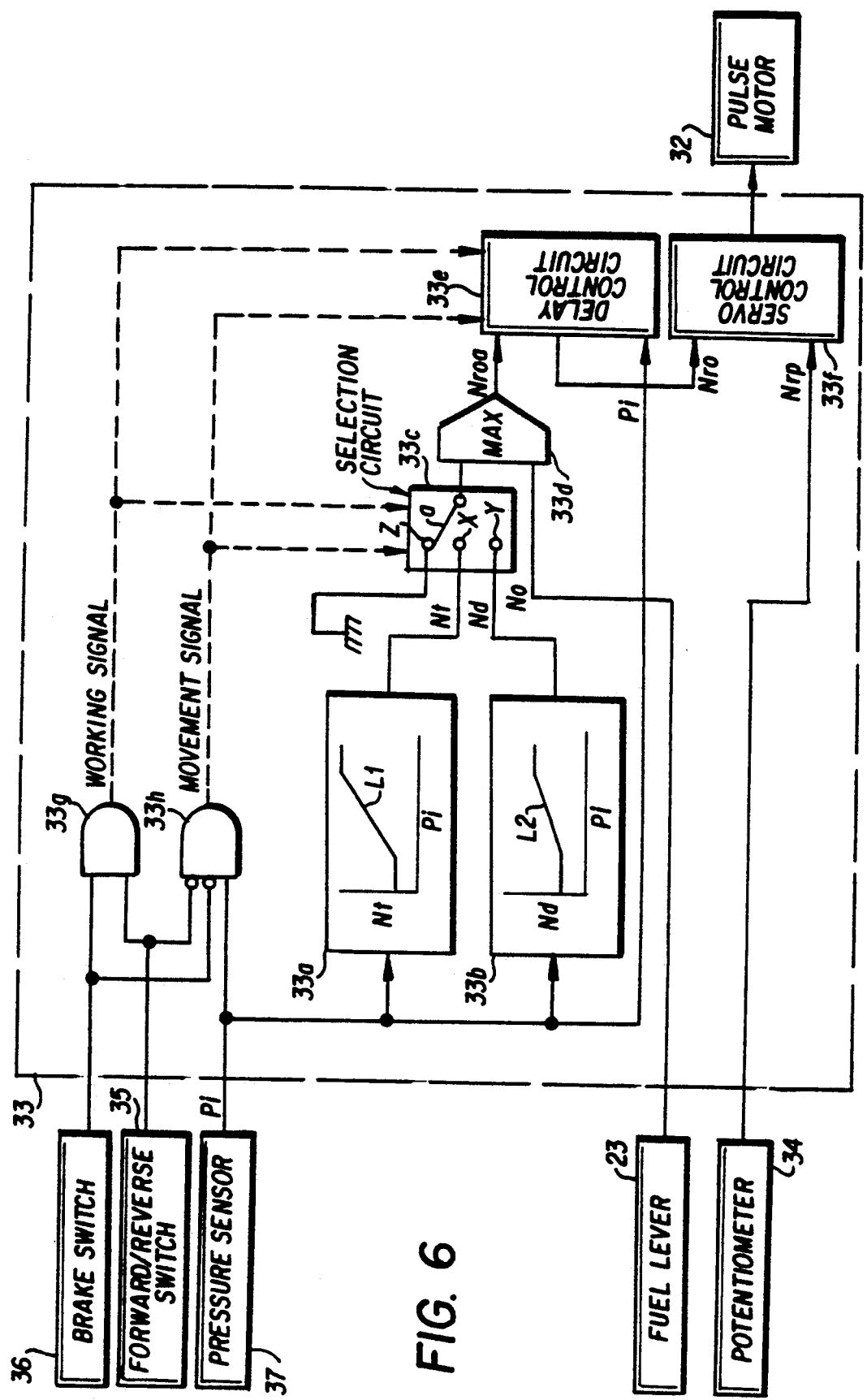
FIG. 6 is a detailed block diagram of a controller shown in FIG. 1.

FIG. 6 is a general view for detailed explanation of the controller 33.

The controller 33 includes two function generators 33a and 33b, a selection circuit 33c, a maximum value selection circuit 33d, a delay control circuit 33e, a servo control circuit 33f, and AND gates 33g and 33h.

A signal representing the pilot pressure Pi detected by the pressure sensor 37 (also representing the amount θp by which the vehicle driving pedal is stepped upon) is input to the function generators 33a and 33b, the delay control circuit 33e, and the AND gate 33h. The function generators 33a and 33b respectivelly output revolution speeds Nt and Nd determined according to functions (revolution speed characteristics) L1 and L2 for the desired revolution speed for the engine 21 as corresponding to the pilot pressure Pi. The function L1 is a driving revolution speed characteristic suitable during vehicle movement, while the function L2 is a working revolution speed characteristic suitable for performing work using the work attachment AT. With the function L1 the rise in revolution speed is steeper than with the function L2, and also the maximum revolution speed is set to be higher. Thus during working it is possible to control the engine revolution speed with the pedal 6a according to a revolution speed characteristic which is appropriate for working, while during vehicle movement it is possible to control the engine revolution speed with the pedal 6a according to a revolution speed characteristic which is appropriate for vehicle movement.

The selection circuit 33c comprises a fixed contact X which is connected to the function generator 33a which outputs the revolution speed Nt according to the revolution speed characteristic L1 suitable for vehicle movement, another fixed contact Y which is connected to the function generator 33b which outputs the revolution speed Nd according to the revolution speed characteristic L2 suitable for working, and a fixed ground contact Z which is connected to ground. When the fixed contact Z is connected, a revolution speed signal is selected which represents a low revolution speed lower even than idling speed. The switching over of this selection circuit 33c is performed by signals from the AND gate 33g and from the AND gate 33h.

The non inverted input terminals of the AND gate 33g are respectivelly connected to the W terminal of the brake switch 36 and to the neutral terminal n of the forward/reverse changeover switch 35. Further, along with the inverted input terminals of the AND gate 33h being connected to the W terminal of the brake switch 36 and to the neutral n terminal of the forward/reverse changeover switch 35, its non inverted input terminal is connected to the pressure sensor 37. Now, when the brake switch 36 is switched to its W position its W terminal goes high level, while in its T or P position its W terminal goes low level. Further, when the forward/reverse changeover switch 35 is switched to its neutral n position its neutral n terminal goes high level, while in its f or r position its n terminal goes low level. And further, when the vehicle driving pedal 6a is stepped upon, the signal from the pressure sensor 37 goes high level. Accordingly, the vehicle moving signal output by the AND gate circuit 33h goes high level during actual vehicle movement, while the working signal output by the AND gate circuit 33g goes high level during working.

According to the switched position of the selection circuit 33c, either the engine revolution speed signal from one or the other of the function generators 33a and 33b, or the low revolution speed signal from the fixed contact Z, is selected and is input to the maximum value selection circuit 33d. To the other input terminal of this maximum value selection circuit 33d there is also supplied the revolution speed No from the fuel lever 23.

The maximum value selection circuit 33d selects the maximum signal among its input signals described above to supply thus selected signal as a target revolution speed Nroa to the delay control circuit 33e. The signals from the AND gates 33g and 33h showing whether the current vehicle operational condition is the moving condition or the working condition, and the pilot pressure Pi showing the amount by which the vehicle driving pedal is stepped upon, are input to the delay control circuit 33e. This delay control circuit 33e calculates the target value Nro for the governor lever position and inputs it to the servo control circuit 33f. The current value of controlled revolution speed, i.e. the value of the detected position Nrp of the governor lever, is also input to the servo control circuit 33f from the above described potentiometer 34, and this servo control circuit 33f performs control according to the procedure shown in FIG. 7 to change the engine revolution speed to the target governor lever position value Nro. In other words, by the operation of both the circuits 33e and 33f, controlled slowing down is performed only when decreasing vehicle speed, and in other circumstances normal revolution speed control is performed according to the amount by which the vehicle driving pedal is stepped upon.

Figure 7:
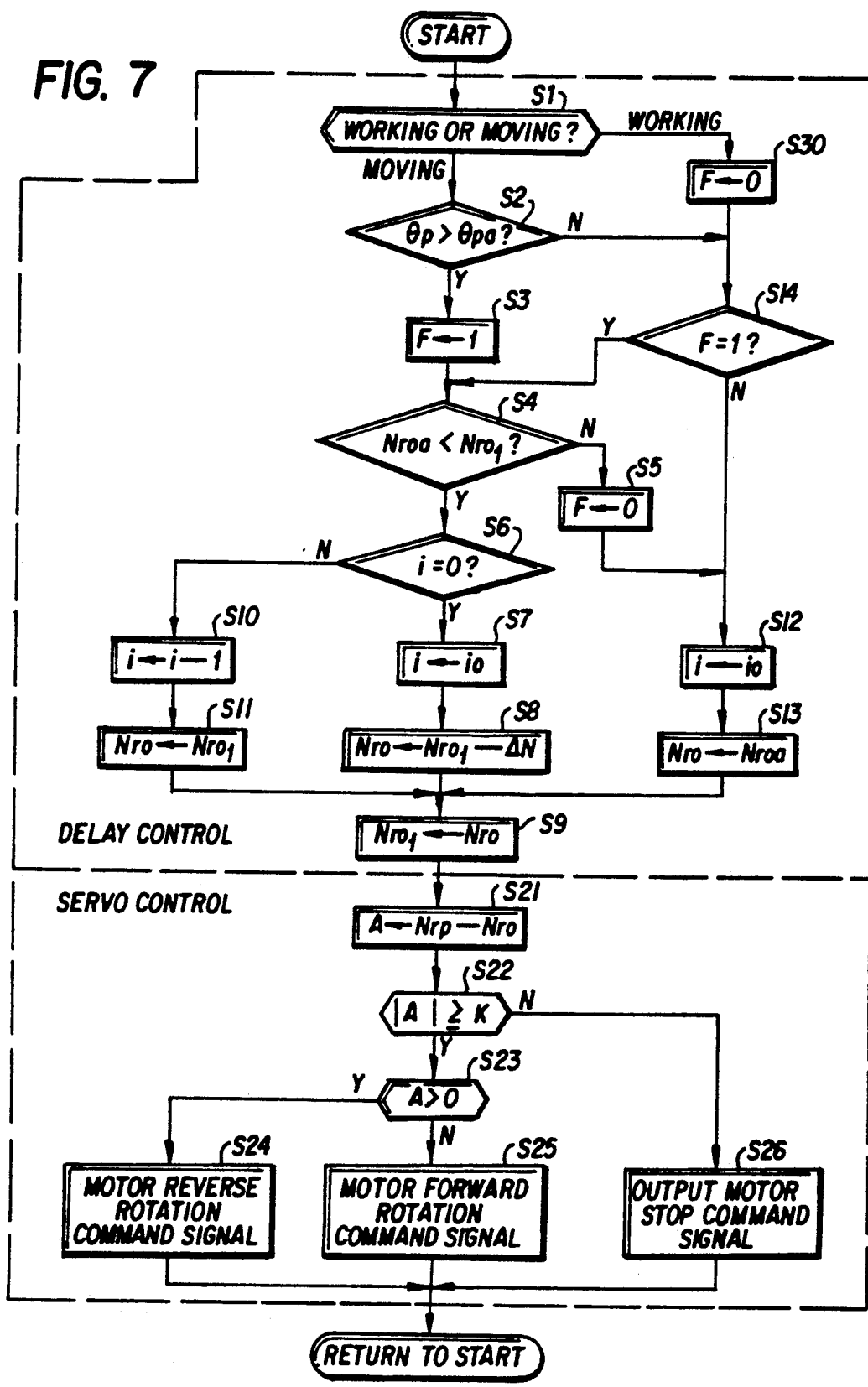
FIG. 7 is a flow chart showing the execution of a program executed by a delay control circuit and a servo control circuit shown in FIG. 1.

FIG. 7 shows the control procedure executed by the program in the delay control circuit 33e and the servo control circuit 33f. In the initial decision step S1, based upon the signals from the AND gates 33g and 33h, a decision is made as to whether the current vehicle operational state is the movement condition or the working condition. It is decided that the current vehicle operational condition is the working condition if the output signal from the AND gate 33g is high level, while it is decided that the current vehicle operational condition is the movement condition if the output signal from the AND gate 33h is high level. If the decision is made that the current vehicle condition is the movement condition, then the flow of control proceeds next to the decision step S2. When it is judged in the step S2 that the angle θp by which the pedal 6a is being depressed is greater than or equal to a fixed angle θpo, the program goes to a step S3 in which a speed reduction flag F1 is set to 1 and the flow of control proceeds to the decision step S4. In the step S4 a decision is made as to whether or not the actual target revolution speed Nroa is less than its value Nro1 the previous time this control procedure was executed. The meaning at this point of Nroa being less than Nro1 is that the vehicle driving pedal is being operated in the direction of speed reduction, i.e. that a command is being given for speed reduction.

If the decision in the step S4 is NO, i.e. if it is decided that the vehicle driving pedal is not being operated in the direction of speed reduction, then in the step S5 the speed reduction flag F1 is set to 0, and the flow of control passes next to the step S12 to be described hereinafter. On the other hand, if the decision in the step S4 is YES, i.e. if it is decided that the vehicle driving pedal is being operated in the direction of speed reduction, then the flow of control passes next to the decision step S6, in which a decision is made as to whether or not the value of a variable i is equal to zero. The variable i is for showing how many times the control loop of FIG. 7 has been repeated. Further, because the speed reduction flag F1 which was set to 1 in the step S3 is set to zero in the step S5 which comes after a NO decision in the decision step S4, therefore the meaning of this flag F1 being equal to 1 is that speed reduction is currently being performed.

If a YES decision is made in the step S6, next in the step S7 a positive constant value io is loaded into the variable i, and next the flow of control proceeds to the step S8. In the step S8 a revolution speed unit $\Delta N$ is subtracted from the actual target revolution speed Nro1 the previous time this control procedure was executed, that is to say, the actual target revolution speed Nro this time through this control procedure is set to Nro1-$\Delta N$. Next the flow of control proceeds to the step S9, in which the value of actual target revolution speed last time Nro1 is replaced by the actual target revolution speed Nro this time, and next the flow of control proceeds to the step S21. On the other hand, if in the decision step S6 a NO decision is made, then in the step S10 the value of the variable i is decremented by 1, and next in the step S11 the value of the actual target revolution speed Nro this time is replaced by the actual target revolution speed last time Nro1, and next the flow of control proceeds to the step S9.

However, if in the decision step S2 a NO decision is made, then in the decision step S14 a decision is made as to whether or not the speed reduction flag F1 is equal to 1. If the decision is YES, then next the flow of control proceeds to the step S4. On the other hand, if the decision is NO, then in the step S12 the positive constant value io is loaded into the variable i, and next the flow of control proceeds to the step S13, in which the value of the actual target revolution speed Nro this time is replaced by the actual target revolution speed last time Nroa, and next the flow of control proceeds to the step S9.

In the step S21, the difference Nrp-Nro between the present governor lever position and the governor lever target value corresponding to the actual target revolution speed is determined, and the result is stored in the memory as a revolution speed difference A, and next in the step S22 a decision is made as to whether or not the absolute value of A is greater than or equal to a predetermined standard revolution speed difference K. If in the decision step S22 the result of the decision is YES, then the flow of control proceeds next to the decision step S23, in which a decision is made as to whether or not the revolution speed difference A is greater than zero. If the result of this decision is YES, then, because the present controlled revolution speed is greater than the actual target revolution speed Nro, in the step S24 a signal is output to the pulse motor 32 to order it to rotate in the reverse direction by just the required amount to reduce the engine revolution speed from its present value by the predetermined revolution speed unit $\Delta N$. This causes the pulse motor 32 to rotate backwards, and thereby the revolution speed of the engine 21 is reduced by just the amount $\Delta N$. The maximum value $\Delta N$ for the above described revolution speed unit is the maximum revolution speed amount which can be incremented or decremented while one cycle through the loop is executed.

On the other hand, if in the decision step S23 the result of the decision is NO, then because the controlled revolution speed is lower than the target revolution speed Nro, in the step S25 a signal is output to the pulse motor 32 to order it to rotate in the forward direction by just the required amount to increase the engine revolution speed from its present value by the above described revolution speed unit $\Delta N$. This causes the pulse motor 32 to rotate forwards, and thereby the revolution speed of the engine 21 is increased by just the amount $\Delta N$. On the other hand, if in the decision step S22 the result of the decision is NO, then the flow of control proceeds next to the step S26, in which a motor stop signal is output, and thereby the revolution speed of the engine 21 is maintained at a constant value. After executing one or the other of the steps S24 through S26, the flow of control next returns to the start of this control procedure.

The above explained steps S1 through S14 show the processing procedure performed by the delay control circuit 33e, and the step S21 and the following show the processing procedure performed by the servo control circuit 33f.

The engine revolution speed is controlled by the first embodiment as explained above in the following manner. At the start of working the brake switch 36 is shifted to its W position, and as described above the main brake device 108 and the parking brake device 106 both are operated, so as to apply working braking. In this condition, when the forward/reverse changeover switch 35 is set to its neutral position n, the output of the AND gate 33g becomes high level, so that the selection circuit 33c is switched over to its Y contact. As a result, the revolution speed characteristic L2 suitable for working from the function generator 33b is selected. On the other hand, if together with switching over the brake switch 36 to its T position or its P position the vehicle driving pedal is stepped upon along with the forward/reverse changeover switch 35 being switched over to its forward position f or to its reverse position r, then the output of the AND gate 33h goes high level, so that the selection circuit 33c is switched over to its X contact. As a result, the revolution speed characteristic L1 suitable for vehicle movement from the function generator 33a is selected.

In any other situation than the two described above, the selection circuit 33c is switched over to its Z contact, and the signal which represents a revolution speed lower than idling speed is selected. By doing this, the revolution speed selected is input to the maximum value selection circuit 33d and is compared with the revolution speed No set by the fuel lever 23, and the one of them which is the greater is selected as the target revolution speed Nroa. Further, this target revolution speed Nroa is input to the delay control circuit 33e and the actual target revolution speed Nro is calculated; and this speed Nro is input to the servo control circuit 33f. And, according to the procedure shown in FIG. 7, controlled slowing down is only performed for speed reduction during vehicle movement, and in other circumstances normal engine revolution speed control is performed.

That is to say, when during vehicle movement the vehicle driving pedal 6a is operated in the direction to accelerate the vehicle, in the step S4 a NO decision is reached, and then in the step S13 the value Nroa selected by the selection circuit 33c is set as the value of the actual target revolution speed Nro, and the engine revolution speed quickly increases according to the operation of the vehicle driving pedal 6a. On the other hand, when during vehicle movement the vehicle driving pedal 6a is operated in the direction to decelerate the vehicle, in the step S4 a YES decision is reached, and only when i=0 the actual target revolution speed Nro is set (in the step S8) to its value the time round before Nro1 decremented by $\Delta N$ (the revolution speed unit). The variable i is progressively decremented by one each time the step S10 is passed through, so that the step S8 is executed each time that the FIG. 7 control loop is repeated i times. Accordingly, the engine revolution speed is decreased in proportion to the passage of time.

Further, if in the step S1 a decision is made that working is being performed, then, because the engine revolution speed is controlled by the loop including the steps S12, S13, S9, and the steps S21 through S26, even when the stepping on amount of the vehicle driving pedal is diminished controlled slowing down is not performed, but instead normal engine revolution speed control is executed, and thus the operational feeling is improved when controlling the engine revolution speed with the vehicle driving pedal during working.

Embodiment 2

Now the second embodiment will be explained with reference to FIGS. 8 and 9. This second embodiment is so constructed that, during vehicle movement, the above controlled slowing down is performed when speed reduction is being performed after the vehicle driving pedal has been stepped upon for more than a predetermined time; while, during vehicle movement, controlled slowing down is not performed, even if the amount of stepping on of the vehicle driving pedal is reduced, when speed reduction operation is being performed before the vehicle driving pedal has been stepped upon for the predetermined time; and thus, during vehicle movement, starting off from rest is prevented when not desired by the operator. Portions which are the same as in the first embodiment will be denoted by the same reference numerals, and the explanation will mainly focus upon the points of divergence from the first embodiment.

Figure 8:
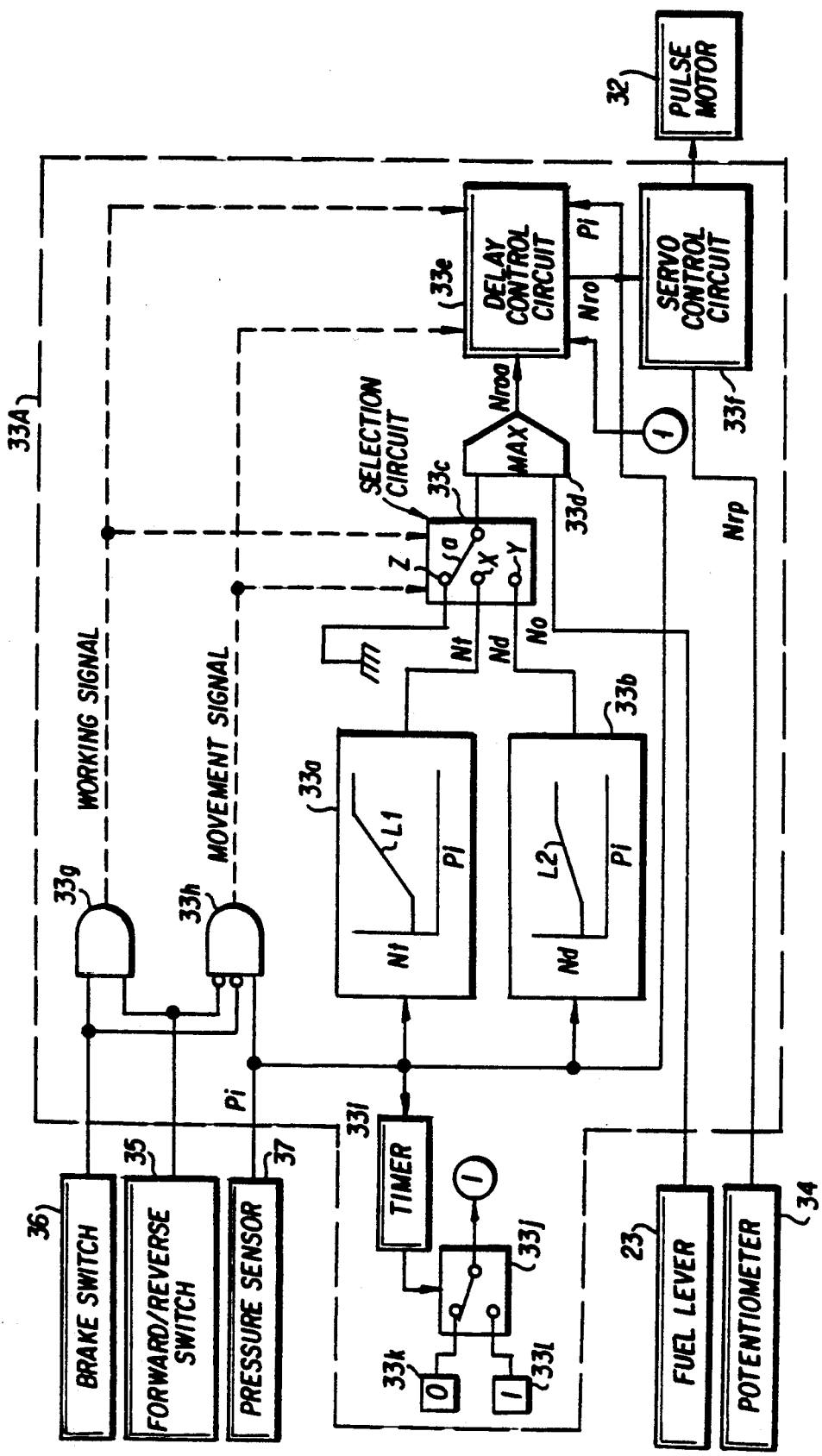
FIG. 8 is a block diagram showing the details of a controller in a second embodiment.

FIG. 8 is a general view for explaining the details of the controller 33A of this second embodiment.

The controller 33A comprises, in the same way as does the controller 33a of FIG. 1, two function generators 33a and 33b, a selection circuit 33c, a maximum value selection circuit 33d, a delay control circuit 33e, a servo control circuit 33f, and AND gates 33g and 33h; and it further comprises a timer 33i, a flag selection switch 33j, and flag setting devices 33k and 33l.

When the moving pilot pressure Pi starts to be produced the timer 33i starts to count time, and after a predetermined time has elapsed the output signal from the timer 33i rises, and the flag-to-"1" setting device 33l is selected by the selection switch 33j. When the moving pilot pressure Pi drops the timer 33i is reset, and at this time the flag selection switch 33j selects the flag-to-"0" setting device 33k. By doing as described later, controlled slowing down is not performed when the flag is set to "0", while controlled slowing down is performed when the flag is set to "1". This flag is called the pedal depression flag F2.

Figure 9:
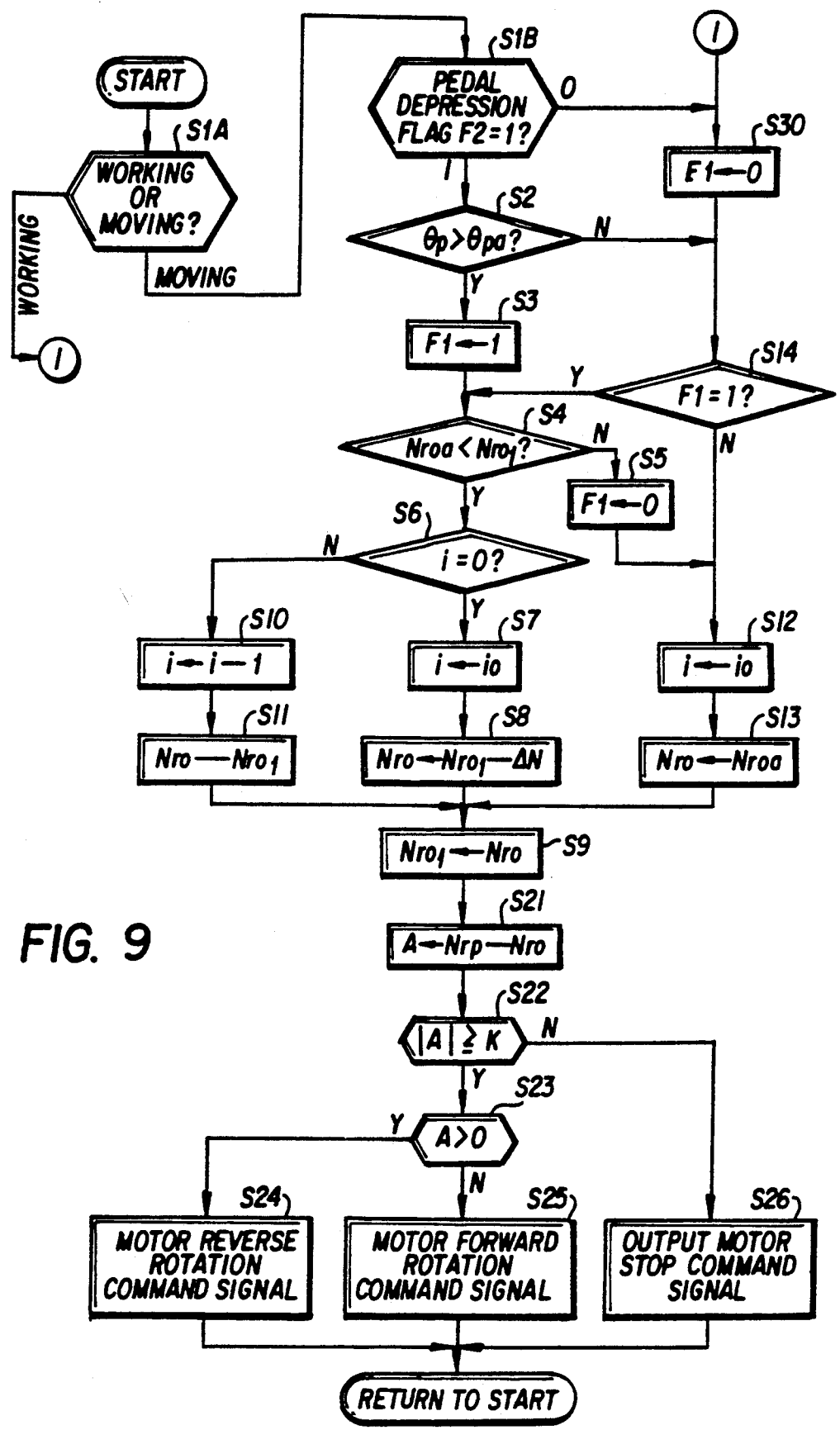
FIG. 9 is a flow chart showing the execution of a program performed by a delay control circuit and a servo control circuit shown in FIG. 8.

FIG. 9 shows, for this second embodiment, the control procedure executed by the program in the delay control circuit 33e and the servo control circuit 33f. Portions which are the same as in the first embodiment will be denoted by the same reference numerals, and the explanation will mainly focus upon the points of divergence from the first embodiment.

In the step S1A, a decision is made as to whether or not the working signal and the vehicle movement signal are ON, and if the vehicle movement signal is ON then the flow of control proceeds next to the step S1B, while if the working signal is ON then the flow of control proceeds next to the step S30. In the step S1B, a decision is made as to whether or not the pedal depression flag F2 is equal to 0 or 1. If the flag F2 is equal to 0, then, because the vehicle driving pedal is depressed at least at this instant, the steps S30 and the following are executed, and the revolution speed of the engine is increased or decreased according to the amount of depression of the vehicle driving pedal. If the flag F2 is equal to 1, then, because the vehicle driving pedal has been depressed by greater than the predetermined time period, the steps S2 and the following are executed, and in the same way as in the first embodiment controlled slowing down can be performed.

With regard to FIG. 9, the steps S1A through S14 show the processing procedure performed by the delay control circuit 33e, and the step S21 and the following show the processing procedure performed by the servo control circuit 33f.

By this kind of second embodiment, according to the procedure shown in FIG. 9, controlled slowing down processing is performed only during vehicle movement when deceleration is being performed after the vehicle driving pedal has been depressed for longer than the predetermined time period, and in other circumstances the revolution speed of the engine is increased or decreased according to the amount of depression of the vehicle driving pedal.

That is to say, when the vehicle driving pedal 6a is depressed even only for an instant, because in the step S1B a NO decision is reached and then the flow of control reaches the step S13 via the steps S30, S14, and S12, controlled slowing down processing is not performed. As a result of this, if the vehicle driving pedal is so to speak blipped, then the engine revolution speed only momentarily increases but then directly returns to the idling revolution speed. Thus, even though the control valve 2 is opened according to an even instantaneously generated vehicle driving pilot pressure, and although after the vehicle driving pedal has been released the control valve 2 remains opened for a considerable time period according to the slow return control, because the engine revolution speed immediately drops to the idling revolution speed and the amount of oil ejected by the hydraulic pressure pump 1 becomes very small, there is no fear of the vehicle moving away since there is hardly any flow of oil to the oil pressure motor 4.

Further, if in the decision step S1A a decision is reached that working is taking place, then because the engine revolution speed is controlled by the program loop comprising the steps S30, S14, S12, S13, S9, and the steps S21 through S26, even when the amount of depression of the pedal is reduced controlled slowing down processing is not performed, but instead normal engine revolution speed control is performed, and the operational feeling is improved when the engine revolution speed is being controlled by the vehicle driving pedal during working.

Further, when during vehicle movement the vehicle driving pedal is operated in the direction to accelerate the vehicle, the engine revolution speed is quickly increased according to the operation of the vehicle driving pedal 6a in the same way as in the first embodiment. On the other hand, when during vehicle movement the driving pedal 6a is operated in the direction to decelerate the vehicle, then the engine revolution speed is decreased in proportion to the passage of time, in the same way as in the first embodiment.

With the above described first and second embodiments, when it is decided by the controller 33 that the vehicle is in the working condition, then the revolution speed Nd is taken from the revolution speed characteristic L2 suitable for working according to the operation of the vehicle driving pedal 6a, and if the fuel lever 23 is moved to the idling position then the revolution speed of the engine 21 is controlled to become this revolution speed Nd. On the other hand, when it is decided that the vehicle is in the vehicle movement condition, then the revolution speed Nt is taken from the revolution speed characteristic L1 suitable for vehicle movement according to the operation of the vehicle driving pedal, and the revolution speed of the engine 21 is controlled to become this revolution speed Nt. With the revolution speed characteristic L1 suitable for vehicle movement the rise of the engine revolution speed in relation to operation of the vehicle driving pedal is steeper than with the revolution speed characteristic L2 suitable for working, and accordingly there is no loss of accelerability during vehicle movement. Further, because during working the revolution speed does not become elevated against the will of the operator, the operability and the fuel economy are enhanced.

Again, with the above described embodiments, when the brake switch 36 is switched to its W position, electric current flows from the battery 38 via the W terminal of the brake switch 36 through the relay coil RC, and opens the normally closed contacts RS1 and RS2. As a result, even if the forward/reverse changeover switch 35 is in its f or in its r position, the forward/reverse changeover valve 8 is kept at its neutral position. Accordingly, even if the operator forgets to switch over the forward/reverse changeover valve 8 to its neutral position when performing revolution speed control by the operation of the vehicle driving pedal 6a, there is no danger of the vehicle moving off from rest against his will.

With these first and second embodiments, a magnitude comparison is made by the operation of the maximum value selection circuit 33d between the target value of engine revolution speed determined according to the operation of the vehicle driving pedal 6a and the target value of engine revolution speed determined according to the operation of the fuel lever 23, and the largest is selected; and thereby the beneficial results are obtained which will now be explained.

Although it is desirable that the engine should be operated at a high revolution speed when the working load is a heavy one, if the engine revolution speed is set to a high region by the operation of the fuel lever 23, it is not necessary for the engine revolution speed to be increased or decreased by stepping on the driving pedal 6a a little bit at a time, and thereby the emission of black smoke is reduced, along with suppressing the harsh noise caused by engine revolution speed increase and decrease. Further, the fuel economy is also enhanced. In the case of a light working load, it is desirable from the points of view of noise and fuel consumption to set the engine revolution speed to a low revolution speed level by the use of the fuel lever 23, and in the case of necessity to increase or decrease the engine revolution speed by the use of the vehicle driving pedal 6a.

Again, according to either of the embodiments described above, setting the maximum revolution speed according to the engine revolution speed characteristic L2 suitable for working even higher than the maximum revolution speed set by the use of the fuel lever has the following beneficial points.

(1) If the construction were such that the revolution speed set by the fuel lever could be extremely high, then there would be a danger that high revolution speed would normally be used, and this would not be desirable from the point of view of longevity of the engine and the hydraulic machinery etc, and in view of the fuel consumption, the noise, and so on. In this connection, by doing as described above, and by regulating the revolution speed to a suitable level even when the fuel lever is set to its maximum value, it is possible to raise the revolution speed to a desired high revolution speed region in times of necessity only (heavy working loads) by the use of the vehicle driving pedal, and thereby, along with being able to guarantee the required magnitude of hydraulic fluid flow even when the working load is heavy, it is possible to assure the long life of the engine and the hydraulic machinery etc, and to reduce fuel consumption and noise levels.

(2) Because by operation of the driving pedal it is possible to operate the apparatus appropriately, the beneficial results detailed in (1) are attained even when a specialized attachment such as a breaker, a crusher, or the like requiring a high hydraulic fluid flow rate is fitted.

Now, although with the above the amount of operation of the vehicle driving pedal 6a is detected by the use of the pilot pressure sensor 37, it would also be acceptable, for example, to detect this amount of operation by fixing a potentiometer or the like directly to the vehicle driving pedal 6a. Further, the construction of the controller also is not limited to that described above. Again, although with the above the construction is such that a single forward/reverse changeover valve 8 is used which can take any one of three positions—a neutral position, a forward movement position, and a reverse movement position—it would also be acceptable for the construction to include two valves: a forward/reverse changeover valve which had two positions—a forward movement position and a reverse movement position—and an opening and closing valve.

With the above-noted device, by setting the idling revolution speed Nti of the revolution speed characteristic L1 suitable for vehicle movement set in the function generator 33a of FIG. 6 higher than the idling revolution speed Ndi of the revolution speed characteristic L2 suitable for working set in the function generator 33b, thereby the following types of advantage are attained without deteriorated fuel consumption during working.

1. When starting the vehicle off from rest and operating the steering, even if the steering actuation angle is great the flow of hydraulic fluid does not become insufficient, and brisk and nimble steering operation is possible.

2. During starting the vehicle off from rest the flow amount of the hydraulic pump becomes high, so that deterioration of the responsiveness for start of the vehicle movement due to the over ride characteristic of the pilot relief valve is prevented.

3. Because the flow amount of the hydraulic pump is high during vehicle deceleration, it never happens that the force required for steering operation suddenly becomes heavy.

4. Cavitation during vehicle deceleration is prevented.

5. The phenomenon of engine dragging during vehicle acceleration does not occur, and the accelerability is improved.

Yet further, although in the above the vehicle movement state is recognized according to switching of the brake switch 36 to other than its W position, according to switching over of the forward/reverse changeover switch to other than its N position, and according to operation of the vehicle driving pedal, it would also be acceptable to recognize the vehicle movement state only according to the condition of the brake switch, or alternatively only according to the condition of the forward/reverse changeover switch. Recognizing the working state according to detection of the actual operation of the parking brake device 106 and the main brake device 108, and discriminating between the vehicle movement state and the working state from the actual position of the forward/reverse changeover valve 8, would also be acceptable. And furthermore, although the above explanations have all been made in terms of a wheel type hydraulic shovel, the present invention can also be applied in the same way to other types of hydraulically driven vehicle.

Figure 11:
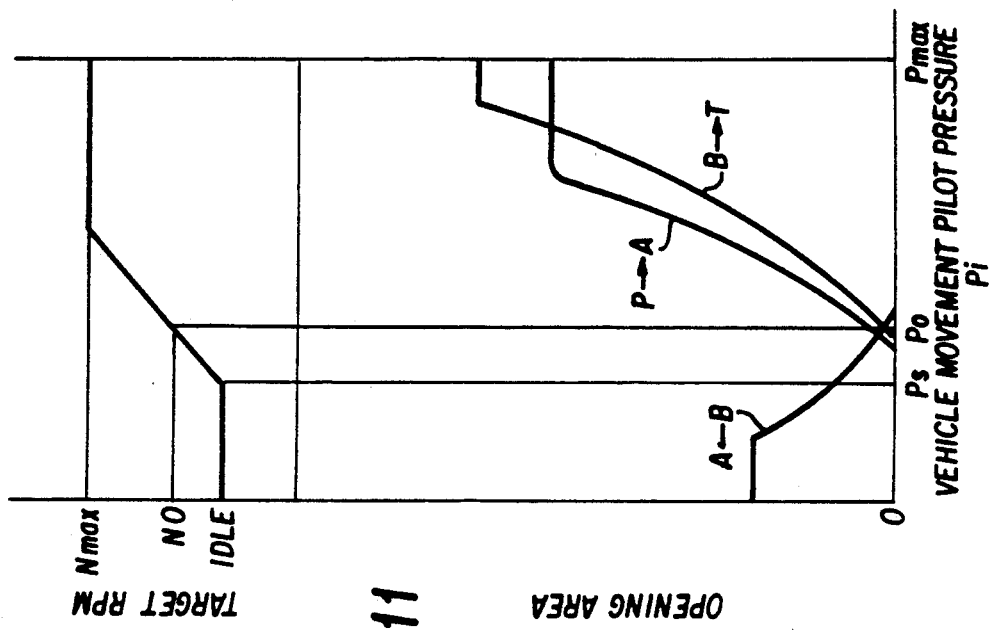
FIG. 11 is a graph for this control valve for vehicle movement used in each of the above embodiments, showing a second example of the valve opening area and engine revolution speed against vehicle driving pilot pressure.

In the following, opening area characteristic for the vehicle movement control valve 2 against the pilot pressure Pi for vehicle movemenfor used in the above described first and second embodiments will be explained with respect to FIGS. 10 and 11.

As shown in FIG. 10 (a), from when the pilot pressure Pi for vehicle movement exceeds a predetermined pressure value Ps until it attains a value Po, only the engine revolution speed is increased; but, when the pilot pressure Pi exceeds the predetermined value Po, then the spool of the control valve 2 starts to move. As a result of this, because after the engine torque rises above a predetermined value pressurized hydraulic fluid is supplied to the hydraulic motor 4 for vehicle movement and vehicle driving torque is generated, overtorque and engine stalling are prevented. Further, the generation of black smoke is also prevented.

Further, if the opening area characteristic for the control valve 2 be arranged to be as shown in FIG. 11(b), although the spool of the control valve 2 is operated simultaneously with generating the pilot pressure Pi for vehicle movement, beneficial results of the same kind as described above are obtained.

That is to say, when in the neutral position this control valve 2 communicates its A and B ports with the maximum opening area, and the opening area between the ports A and B progressively is closed substantially until the pilot pressure Pi exceeds the predetermined pressure Po, and substantially when the predetermined pressure Po is reached communication is interrupted between the ports A and B. Also, substantially when the predetermined pressure Po comes to be exceeded, the opening between the ports P and A starts to open up, as does that between the ports B and T. On the other hand, the engine revolution speed, as shown in FIG. 11(a), starts to be increased when the pilot pressure Ps exceeds the predetermined value Ps, in the same way as in FIG. 10.

Industrial Applicability

The engine revolution speed control device according to the present invention explained above provides beneficial effects when utilized in a self propelled construction machine such as a wheel type hydraulic shovel, a tracked crane including so called a rough terrain crane, a wheeled loader or the like.

We claim:

1. An engine revolution speed control device for a hydraulically driven vehicle, comprising:
    a hydraulic pump which is driven by an engine;
    a hydraulic motor for vehicle movement which is driven by oil expelled from said hydraulic pump during vehicle movement;
    an actuator for working which is driven by the oil expelled from said hydraulic pump during the working state;
    a vehicle driving pedal which during vehicle movement controls vehicle speed according to its amount of operation;
    a means for speed reduction decision which makes a decision as to whether the amount by which said vehicle driving pedal is depressed is being reduced; and,
    a means for revolution speed control, which performs: a first type of engine revolution speed control by increasing or decreasing the revolution speed of said engine according to the amount by which said vehicle driving pedal is depressed; and a second type of engine revolution speed control by reducing the revolution speed of said engine while delaying its reduction amount, when it is decided that the amount by which said vehicle driving pedal is depressed is decreasing; characterized in that,
    said engine revolution speed control device further comprises:
    a means for prevention, which in specific operational conditions prevents said second type of engine revolution speed control even when the amount by which said vehicle driving pedal is depressed is decreasing.

2. An engine revolution speed control device for a hydraulically driven vehicle according to claim 1, wherein said prevention means includes;
    a means for detecting the working state which makes a decision as to whether said hydraulic actuator for working is in the state of being able to be actuated, and,
    said control of engine revolution speed by said second type of engine revolution speed control is prevented by said prevention means, when a decision is made by said working state detection means that said hydraulic actuator for working is in the state of being able to be actuated.

3. An engine revolution speed control device for a hydraulically driven vehicle according to claim 1, further comprising a means for detecting upon the vehicle movement state which makes a decision as to whether said hydraulic motor for vehicle movement is being operated; and wherein,
    engine revolution speed is controlled by said means for revolution speed control according to said second type of engine revolution speed control, when a detection is made by said vehicle movement state detection means that said hydraulic motor for vehicle movement is operated.

4. An engine revolution speed control device for a hydraulically driven vehicle according to claim 1, further comprising a means for detecting the vehicle movement state which makes a decision as to whether said hydraulic motor for vehicle movement is being operated; and wherein, said prevention means includes a means for detecting the working state which makes a decision as to whether said hydraulic actuator for working is in the state of being able to be actuated; and wherein, said control of engine revolution speed by said second type of engine revolution speed control is prevented by said prevention means, when a decision is made by said working state detection means that said hydraulic actuator for working is in the state of being able to be actuated, and engine revolution speed is controlled by said means for revolution speed control according to said second type of engine revolution speed control, when a decision is made by said vehicle movement state detection means that said hydraulic motor for vehicle movement is being operated.

5. An engine revolution speed control device for a hydraulically driven vehicle according to claim 2 said hydraulically driven vehicle comprising;

a means for detecting forward and reverse movement which detects forward and reverse movement and the neutral state of the vehicle, a working brake device which during the working state provides braking force to a running wheel of the vehicle, and, a means for detecting braking which detects as to whether said working brake device is in operation; and wherein, said working state detection means makes a positive working state decision when said forward and reverse movement detection means detects the neutral state of the vehicle and also said braking detection means detects the operation of said working brake device.

6. An engine revolution speed control device for a hydraulically driven vehicle according to claim 3 said hydraulically driven vehicle comprising;

a means for detecting forward and reverse movement which detects forward and reverse movement and the neutral state of said vehicle, a working brake device which during the working state provides braking force to a running wheel of the vehicle, a means for detecting braking which detects as to whether said working brake device is not in operation, and, a hydraulic motor operation detection means which detects as to whether said hydraulic motor for vehicle movement is being operated; and wherein, said vehicle movement detection means makes a positive vehicle movement decision when said forward and reverse movement detection means detects a state other than the neutral state of the vehicle, said braking detection means does not detect the operation of said working brake device, and also operation of said hydraulic motor for vehicle movement is detected.

7. An engine revolution speed control device for a hydraulically driven vehicle according to claim 1 wherein said engine is a diesel engine, and said revolution speed control means comprises:

a means for commanding, which commands a target engine revolution speed;

a means for detection, which detects the position of a governor lever showing control revolution speed; and, a means for driving, which drives and controls the governor lever based upon the difference between the target engine revolution speed and the control revolution speed.

8. An engine revolution speed control device for a hydraulically driven vehicle according to claim 7, wherein said second type of engine revolution speed control is achieved by delaying the timing of drive controlling said governor lever based upon the difference between the target engine revolution speed and the control revolution speed.

9. An engine revolution speed control device for a hydraulically driven vehicle according to claim 1 wherein said revolution speed control means during vehicle movement sets the revolution speed of said engine when said vehicle driving pedal is not operated to a first idling revolution speed, and during working sets the revolution speed of said engine when said vehicle driving pedal is not operated to a second idling revolution speed lower than said first idling revolution speed.

10. An engine revolution speed control device for a hydraulically driven vehicle according to claim 1 further comprising a control valve which conducts oil expelled from said hydraulic pump to said hydraulic motor for vehicle movement in a flow amount according to the amount by which said vehicle driving pedal is depressed, and which starts to move towards the open position in a region above an amount of depression which increases the revolution speed of said engine up to a predetermined value.

11. An engine revolution speed control device for a hydraulically driven vehicle according to claim 1, wherein said prevention means includes a depression time determination means which determines the time period for which said vehicle driving pedal has been depressed, and prevents the controlling of engine revolution speed by said second type of engine revolution speed control when said vehicle driving pedal has not ben depressed for at least a predetermined time period, as determined by said depression time determination means.

12. An engine revolution speed control device for a hydraulically driven vehicle according to claim 11, wherein said engine is a diesel engine, and said revolution speed control means comprises:

a means for commanding, which commands a target engine revolution speed;

a means for detection, which detects the position of a governor lever showing control revolution speed; and, a means for driving, which drives and controls the governor lever based upon the difference between the target engine revolution speed and the control revolution speed.

13. An engine revolution speed control device for a hydraulically driven vehicle according to claim 12, wherein said second type of engine revolution speed control is achieved by delaying the timing of drive controlling said governor lever based upon the difference between the target engine revolution speed and the control revolution speed.

14. An engine revolution speed control device for a hydraulically driven vehicle according to claim 11 wherein said revolution speed control means during vehicle movement sets the revolution speed of said engine when said vehicle driving pedal is not operated to a first idling revolution speed, and during working sets the revolution speed of said engine when said vehicle driving pedal is not operated to a second idling revolution speed lower than said first idling revolution speed.

15. An engine revolution speed control device for a hydraulically driven vehicle according to claim 11 further comprising a control valve which conducts oil expelled from said hydraulic pump to said hydraulic motor for vehicle movement in a flow amount according to the amount by which said vehicle driving pedal is depressed, and which starts to move towards the open position in a region above an amount of depression which increases the revolution speed of said engine up to a predetermined value.

* * * * *